(12) United States Patent
Obata et al.

(10) Patent No.: US 6,295,263 B1
(45) Date of Patent: Sep. 25, 2001

(54) ELECTRONIC APPARATUS

(75) Inventors: Katsuyuki Obata, Tokyo; Masaomi Ishida, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/284,379
(22) PCT Filed: Aug. 14, 1998
(86) PCT No.: PCT/JP98/03638
§ 371 Date: Jun. 28, 1999
§ 102(e) Date: Jun. 28, 1999
(87) PCT Pub. No.: WO99/09557
PCT Pub. Date: Feb. 25, 1999

(30) Foreign Application Priority Data

Aug. 14, 1997 (JP) .................................................. 9-219495

(51) Int. Cl.$^7$ .................................................. G11B 33/02
(52) U.S. Cl. .......................................... 369/75.1; 381/336
(58) Field of Search ................................. 369/75.1, 75.2, 369/76, 80, 81, 12; 312/223.1, 223.2, 196; 381/64, 92, 335, 336

(56) References Cited

U.S. PATENT DOCUMENTS

| | | | |
|---|---|---|---|
| 2,292,745 | * 8/1942 | Davis | 381/64 |
| 2,431,962 | * 12/1947 | Rettinger | 381/64 |
| 2,614,846 | * 10/1952 | Cain | 369/191 |
| 3,912,278 | * 10/1975 | Teutsch | 369/75.1 |
| 4,051,919 | * 10/1977 | Buettner | 181/144 |
| 4,249,037 | * 2/1981 | Dexter | 381/24 |
| 4,831,476 | * 5/1989 | Branc et al. | 360/97.02 |
| 5,274,709 | * 12/1993 | Koizumi | 381/24 |
| 5,436,976 | * 7/1995 | Dougherty | 381/88 |
| 5,473,684 | * 12/1995 | Bartlett et al. | 379/387 |
| 5,662,376 | * 9/1997 | Breuer et al. | 297/216.2 |
| 5,706,173 | * 1/1998 | Carney et al. | 361/740 |
| 5,963,652 | * 10/1999 | Tran et al. | 381/109 |
| 6,053,747 | * 4/2000 | Aggus et al. | 439/67 |
| 6,088,224 | * 7/2000 | Gallagher et al. | 361/695 |

FOREIGN PATENT DOCUMENTS

| | | |
|---|---|---|
| 32-11007 | * 9/1957 | (JP) . |
| 406301391 | * 10/1994 | (JP) . |
| 6301391 | * 10/1994 | (JP) . |

* cited by examiner

Primary Examiner—David L. Ometz
Assistant Examiner—Franklin D. Altman
(74) Attorney, Agent, or Firm—Jay H. Maioli

(57) ABSTRACT

An electronic apparatus for use in recording and/or playing back audio or video signals includes a six-sided housing of which at least a pair of opposite sides are arranged not parallel to each other, and a signal processor unit mounted in the housing and including at least a circuit board which has a degree of rigidity. The circuit board is arranged with its main side facing the non-parallelly arranged, paired opposite sides of the housing. This prevents the generation of resonance between the housing and the circuit board caused by a stress of vibration introduced to the housing and the circuit board, thus hardly allowing the audio or video signals to deteriorate their recording and/or playback properties.

28 Claims, 6 Drawing Sheets

PROFILES WITH EMISSION OF 1KHz
SOUND FROM LOUDSPEAKER

PROFILES WHEN WOODEN BLOCK
IS FALLEN DOWN ON FLOOR

PROFILES WHEN WOODEN BLOCK
IS FALLEN DOWN ON FLOOR

ELECTRONIC APPARATUS

TECHNICAL FIELD

The present invention relates to an electronic apparatus for use in recording and/or playing back audio or video signals and more particularly, to an electronic apparatus in which excessive vibration caused by resonance on its circuit board which constitutes a signal processor and is mounted in a housing of the apparatus can be prevented.

BACKGROUND ART

A disk playback apparatus using a disk recording medium has been known as such an electronic apparatus for recording and/or playing back an audio signal and a video signal.

As shown in FIGS. 1 and 2, such a known disk playback apparatus 100 has a housing 101 serving as a main body thereof The housing 101 has a rectangular block shape comprising a top panel 102 forming the top side thereof, a bottom panel 103 forming the bottom side thereof, a front panel 104 forming the front side thereof, a back panel 105 forming the back side thereof, and two, left and right, side panels 106 and 107 forming the left and right sides thereof More particularly, the housing 101 is shaped by assembling with any two opposite sides arranged parallel to each other; the top panel 102 and the bottom panel 103, the front panel 104 and the back panel 105, and the left panel 106 and the right panel 107.

A support leg 108 made of a vibration absorbing material such as rubber is mounted to each corner of the bottom panel 103 of the housing 101. The housing 101 is placed with its support legs 108 directly on a platform 109 such as a table or a bed.

A first circuit board 111 and a second circuit board 112 serving as a playback unit and a signal processor of the disk playback apparatus 100 are installed in the housing 101. The circuit boards 111 and 112 are shaped of a flat sheet-like form which is made of a synthetic resin material having a degree of rigidity and located in the housing 101 so as to extend in parallel to both the top panel 102 and the bottom panel 103.

Also, a disk rotating mechanism 113 for rotating the recording medium or an optical disk 99 of the disk playback apparatus 100 is mounted in the housing 101. The disk rotating mechanism 113 has a spindle motor 114 and a disk table 116 mounted to the distal end of a spindle 115 of the spindle motor 114, as shown in FIG. 1. The disk rotating mechanism 113 is secured with its spindle motor 114 fixedly joined to a base 117 in the housing 101. In particular, the spindle motor 114 is anchored to the base 117 so that its spindle 115 extends vertical to the top panel 102 and the bottom panel 103 which are arranged parallel to each other. The disk table 116 on which the optical disk 99 is loaded is mounted to the distal end of the spindle 115 so that its optical disk 99 loading surface is vertical to the spindle 115 and it can rotate together with the optical disk 99.

Since the loading surface of the disk table 116 extends vertical to the spindle 115, the optical disk 99 when loaded on the disk table 116 is supported at its main side parallel to the top panel 102 and the bottom panel 103.

As not shown, a loudspeaker unit for playing back the audio signal read out from the optical disk 99 to emit acoustic sound is also installed in the housing 101.

The disk playback apparatus 100 having the foregoing arrangement is placed with its support legs 108, mounted to the bottom panel 103 of the housing 101, directly on the platform 109 and during the playback action, its housing 101 receives external acoustic power or vibration from the platform 109 or the ambient space. The vibration received from the platform 109 may be attenuated by the support legs 108 made of the vibration absorbing material and prevented from direct propagation to the housing 101 itself and the inside of the housing 101. However, the external acoustic power or vibration from the ambient space is directly transmitted to the housing 101 of the apparatus and produces a significant of vibration on the housing 101.

Also, the disk rotating mechanism 113 in the disk playback apparatus 100 generates vibration when it starts driving. The vibration from the disk rotating mechanism 113 is transmitted via the base 117 to and vibrates the first circuit board 111 and the second circuit board 112. Moreover, the sound emitted from the loudspeaker unit propagates to and vibrates the first circuit board 111 and the second circuit board 112.

In the conventional disk playback apparatus 100 as an electronic apparatus, the top panel 102 and the bottom panel 103 of the housing 101 facing each other extend parallel to each other while the first 111 and the second circuit board 112 in the housing 101 are arranged parallel to both the top panel 102 and the bottom panel 103. This causes the vibration generated on the top panel 102, the bottom panel 103, and the two circuit boards 111 and 112 to repeat reflection between the top panel 102 and the first circuit board 111, between the bottom panel 103 and the second circuit board 112, and between the first circuit board 111 and the second circuit board 112, as denoted by the arrow in FIG. 1, thus creating unwanted resonance between the top panel 102 and each of the two circuit boards 111 and 112 and between the bottom panel 103 and each of the two circuit boards 111 and 112. The resonance will then trigger excessive vibration on the top panel 102, the bottom panel 103, and the first circuit board 111 and the second circuit board 112 of which the amplitude is greater than that of the original vibration generated in the housing 101 or of the external vibration introduced to the housing 101.

The support legs 108 of the disk playback apparatus 100 are identical in height. While the disk playback apparatus 100 is placed with its support legs 108 directly on the platform 109, its bottom panel 103 becomes parallel to the platform 109. This causes the vibration derived from the bottom panel 103 or the platform 109 to repeat reflection between the bottom panel 103 and the platform 109, as denoted by the arrow in FIG. 1, hence creating a significant resonance between the bottom panel 103 and the platform 109. Accordingly, the resonance will trigger excessive vibration on the bottom panel 103 of which the amplitude is greater than that of the external vibration introduced to the bottom panel 103. The excessive vibration on the bottom panel 103 repeats reflection between the first circuit board 111 and the second circuit board 112 and produces greater resonance which then vibrates the two circuit boards 111 and 112 to a higher amplitude.

The excessive vibration on the two circuit boards 111 and 112 and thus electronic components of the circuit boards 111 and 112 impairs the action of the signal processor unit on the circuit boards 111 and 112. Particularly in the disk playback apparatus as an electronic apparatus, the audio or video signal read out from an optical disk may be added with unwanted noise components caused by the vibration and its properties will be declined in the playback.

DISCLOSURE OF THE INVENTION

It is an object of the present invention to provide an electronic apparatus capable of recording and/or playing back audio signals and video signals while preventing the declination of the recording and/or playback properties of the signals.

It is another object of the present invention to provide a novel electronic apparatus which receives no effect of the vibration introduced from outside.

It is a further object of the present invention to provide an electronic apparatus which is improved in selecting the materials of a housing and circuit boards without limitations in order to avoid the effect of vibration introduced from outside and can thus be decreased in the cost of production.

For achievement of the object of the present invention, an electronic apparatus is provided for use in recording and/or playing back audio or video signals, comprising: a six-sided housing of which at least a pair of opposite sides are arranged not parallel to each other; and a signal processor unit mounted in the housing. The signal processor unit includes at least a circuit board which has a degree of rigidity and is installed in the housing.

Another electronic apparatus according to the present invention is provided for use in recording and/or playing back audio or video signals, comprising: a six-sided housing of which at least a pair of opposite sides are arranged not parallel to each other; and a signal processor unit mounted in the housing and including at least a circuit board which has a degree of rigidity. The circuit board is arranged with its main side facing the paired opposite sides of the housing, whereby the generation of resonance between the main side of the circuit board and the paired opposite sides of the housing will be prevented.

A further electronic apparatus according to the present invention is provided for use in recording and/or playing back audio or video signals, comprising: a six-sided housing of which at least a pair of opposite sides are arranged not parallel to each other; and a playback unit mounted in the housing for playing back a disk recording medium. The playback unit includes at least a circuit board of a flat sheet-like shape which has a degree of rigidity and is arranged with its main side facing the paired opposite sides of the housing, whereby the generation of resonance between the main side of the circuit board and the paired opposite sides of the housing will be prevented.

A still further electronic apparatus according to the present invention is provided for use in recording and/or playing back audio or video signals, comprising: a six-sided housing; and a signal processor unit mounted in the housing and including at least a circuit board which has a degree of rigidity. The circuit board is arranged not parallel to at least a pair of opposite sides of the housing, whereby the generation of resonance between the circuit board and the paired opposite sides of the housing facing the circuit board will be prevented.

A still further electronic apparatus according to the present invention is provided for use in recording and/or playing back audio or video signals, comprising: a six-sided housing; and a playback unit mounted in the housing for playing back a disk recording medium. The playback unit includes at least a circuit board which has a degree of rigidity and is arranged with its main side facing a pair of opposite sides of the housing, whereby the generation of resonance between the circuit board and the paired opposite sides of the housing facing the circuit board will be prevented.

The playback unit may have a disk rotating mechanism for rotating the disk recording medium. The disk rotating mechanism may be arranged so that the disk recording medium loaded thereon is not parallel to each of the paired opposite sides of the housing.

Other objects of the present invention and practical advantages obtained by the present invention will be more apparent from the following description of embodiments.

BEST MODE FOR CARRYING OUT THE INVENTION

The present invention will be described in the form of a disk playback apparatus provided with an optical disk as the recording medium.

Figure 1:
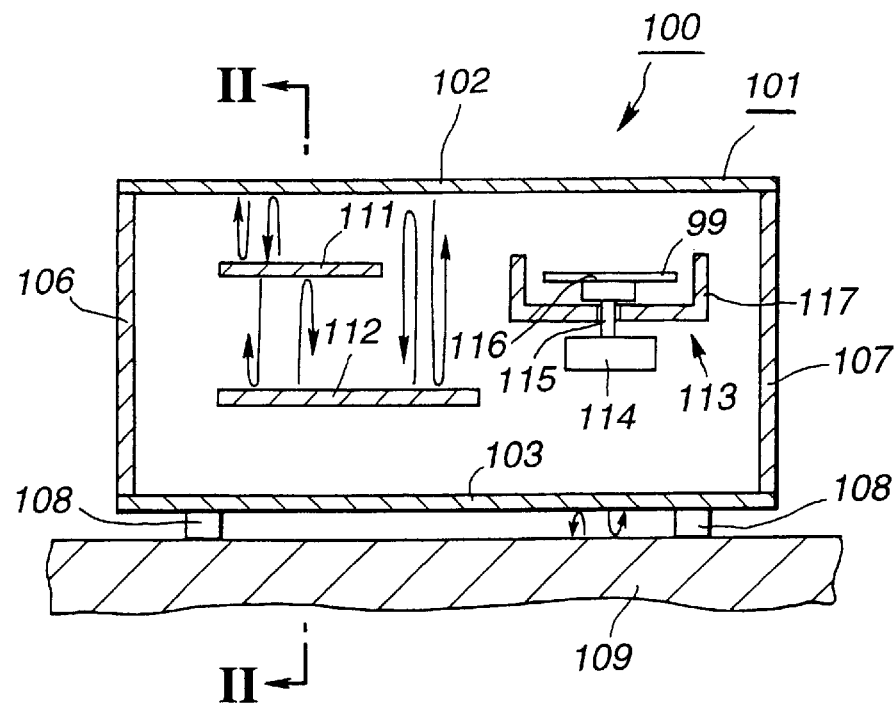
FIG. 1 is a cross sectional side view showing a schematic construction of a conventional disk playback apparatus.
Figure 2:
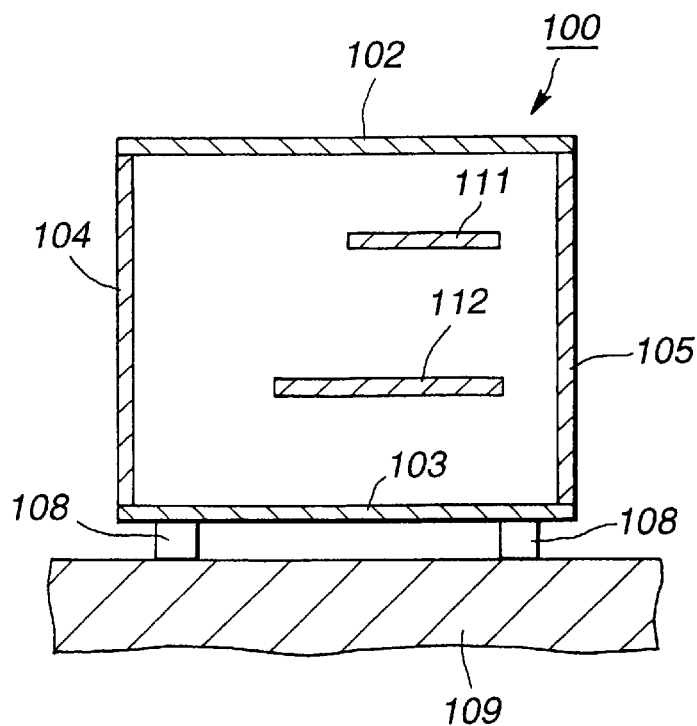
FIG. 2 is a cross sectional view taken along the line II—II of FIG. 1.
Figure 3:
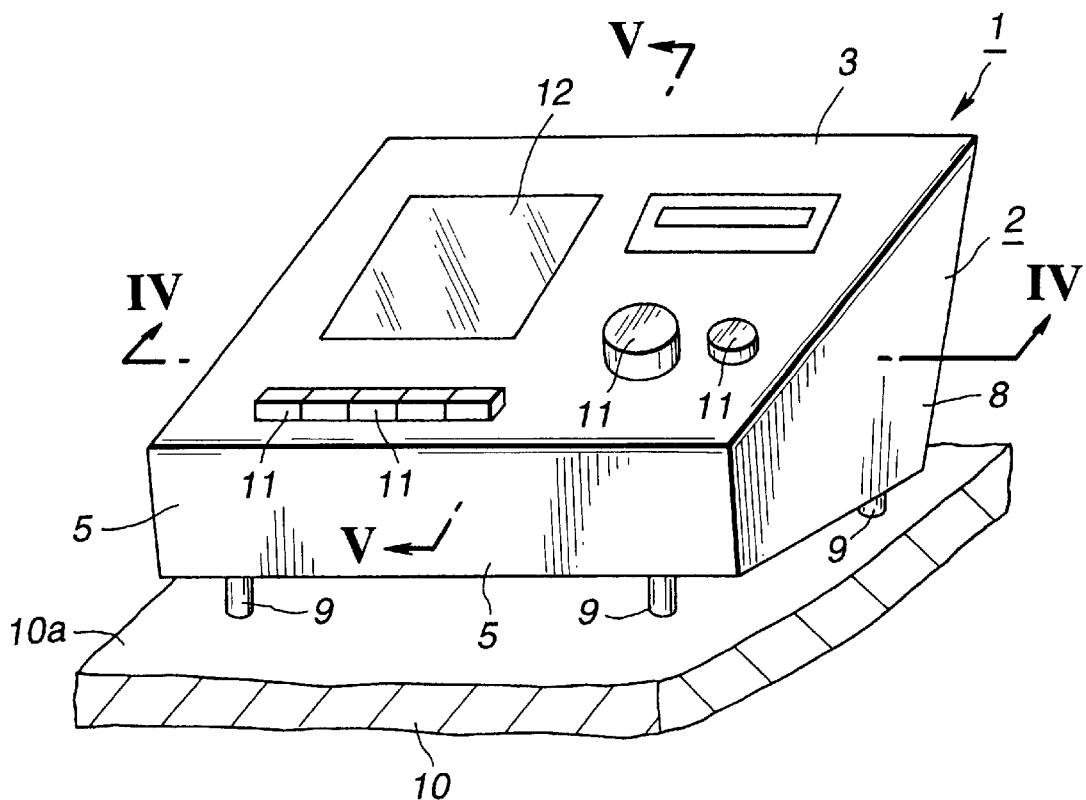
FIG. 3 is a perspective view of a disk playback apparatus according to the present invention.
Figure 4:
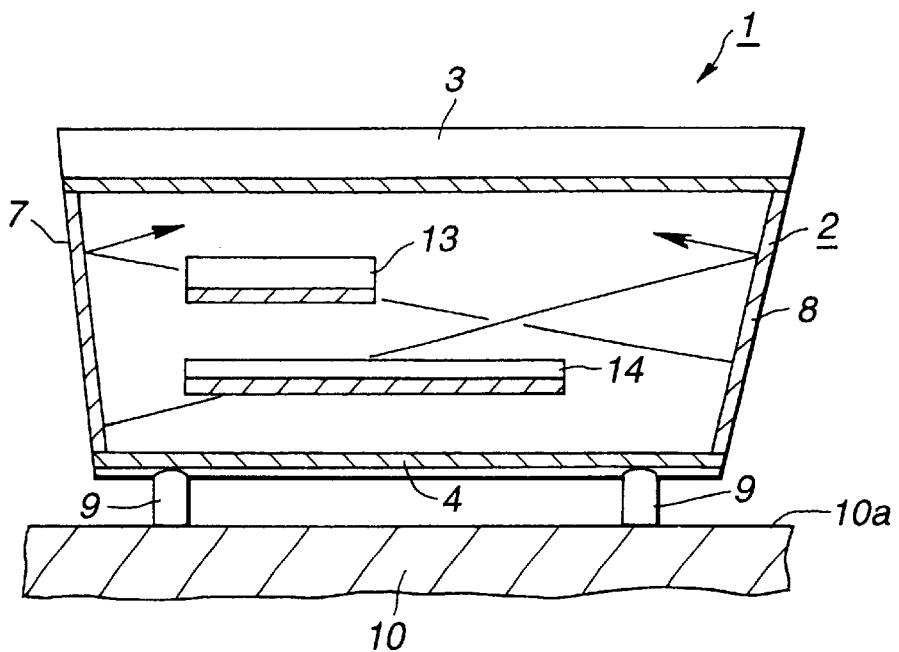
FIG. 4 is a cross sectional view taken along the line IV—IV of FIG. 3.
Figure 5:
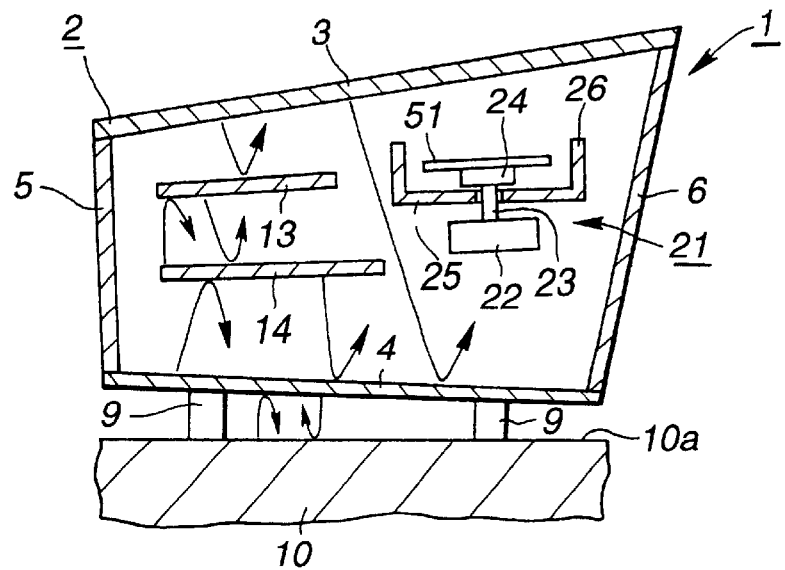
FIG. 5 is a cross sectional view taken along the line V—V of FIG. 3.

The disk playback apparatus 1 according to the present invention has a housing 2 acting as the main body as shown in FIGS. 3, 4, and 5. The housing 2 is a six-sided body comprising a top panel 3 forming a top side of the housing 2, a bottom panel 4 forming a bottom side of the housing 2, a front panel 5 forming a front side of the housing 2, a back panel 6 forming a back side of the housing 2, and two, left and right, side panels 7 and 8 forming both sides of the housing 2.

The top panel 3, the bottom panel 4, the front panel 5, the back panel 6, and the two side panels 7 and 8 of the six-sided housing 2 are made of flat wooden plates, where any two opposite plates panels are arranged not parallel to each other.

More specifically, each pair of the top panel 3 and the bottom panel 4, the front panel 5 and the back panel 6, and the left panel 7 and the right panel 8 are arranged not parallel to each other. The top panel 3 is tilted with its rear end spaced further from the bottom panel 4 as shown in FIGS.

3 and 5 and slopes up towards the back side of the housing 2. Also, the bottom panel 4 is tilted with its rear end spaced further from the top panel 3 as shown in FIG. 3 and 5 and slopes down towards the back side of the housing 2. The top panel 3 and the bottom panel 4 deviate from each other as they extend from the front side to the back side of the housing 2 and are thus not parallel to each other. Referring to FIG. 5, the front panel 5 and the back panel 6 deviate from each other as they extend from the bottom panel 4 to the top panel 3 and are hence not parallel to each other. Similarly referring to FIG. 4, the two, side panels 7 and 8 deviate from each other as they extend from the bottom panel 4 to the top panel 3 and are hence not parallel to each other.

The bottom panel 4 of the housing 2 has a support leg 9 provided at each corner thereof made of a vibration absorbable material such as rubber. The housing 2 is supported by the support legs 9 on a platform 10 such as a table or a mounting bed. The two support legs 9 on the front panel side are different in height from the other two support legs 9 located on the back panel side of the housing 2, as best shown in FIG. 5. Because the height of the front and back support legs 9 is different, the disk playback apparatus 1 of the present invention placed with its support legs 9 directly on the platform 10 is maintained with its bottom panel 4 not parallel to the mounting surface 10a of the platform 10.

Provided on the upper surface of the top panel 3 of the housing 2 are a set of operating buttons 11 for selecting the operation mode and other functions for controlling the disk playback apparatus 1 and a hatch door 12 for loading and unloading an optical disk on the disk playback apparatus 1.

The housing 2 having the foregoing structure contains, first and second circuit boards 13 and 14 acting as a playback unit and a signal processor unit respectively of the disk playback apparatus 1. The two circuit boards 13 and 14 are flat substrates made of a synthetic resin impregnated material which is prepared by impregnating a sheet of paper with phenol resin or a size of glass fiber with epoxy resin and has a degree of rigidity. As shown in FIG. 5, the first circuit board 13 and the second circuit board 14 are mounted in the housing 2 with their main surfaces kept not parallel to the top panel 3 and the bottom panel 4 respectively. More particularly, the first circuit board 13 and the second circuit board 14 are situated in the housing 2 with their angles to the corresponding horizontal surfaces of the top panel 3 and the bottom panel 4 different from each other. In practice, the two circuit boards 13 and 14 are maintained tilting up towards the back side of the housing 2.

In addition, the first and second circuit boards 13 and 14 installed in the housing 2 are unparallel not only to the top panel 3 and the bottom panel 4 but also to each other, as shown in FIG. 5. More specifically, the angle between the first circuit board 13 and the horizontal plane is greater than the angle between the second circuit board 14 located in a lower side of the housing 2 and the horizontal plane. Simultaneously, the angle between the first circuit board 13 and the horizontal plane is smaller than the angle between the top panel 3 and the horizontal plane as installed in the housing 2.

It is essential that the first and second circuit boards 13 and 14 installed in tilting relationship in the housing 2 are prevented from their main surfaces being at an angle of 45 degrees to the top panel 3 and the bottom panel 4.

A disk rotating mechanism 21 for rotating the optical disk 51 which is a recording medium in the disk playback apparatus is installed in the housing 2. As shown in FIG. 5, the disk rotating mechanism 21 comprises a spindle motor 22 and a disk table 24 mounted to the distal end of a spindle 23 of the motor 22. The disk rotating mechanism 21 is anchored with its spindle motor 22 to a base 25 installed in the housing 2. The spindle motor 22 is secured to the base 25 so that its spindle 23 extends vertical to the mounting surface 10a of the platform 10 on which the disk playback apparatus 1 is placed. The disk table 24 mounted to the distal end of the spindle 23 of the spindle motor 22 has a loading surface 24a, on which the optical disk 51 is loaded, provided vertical to the spindle 23 for rotation together with the spindle 23.

Because the disk table 24 is arranged with its disk loading surface 24a sitting vertical to the spindle motor 23, the optical disk 51 when loaded on the disk table 24 becomes at its main side parallel to the mounting surface 10a of the platform 10 on which the disk playback apparatus 1 is placed but not parallel to the top panel 3 and the bottom panel 4.

An upright wall 26 is provided about the base 25 by which the spindle motor 22 so that it surrounds the optical disk 51 loaded on the disk table 24. The upright wall 26 is designed to guide the optical disk 51 when being loaded onto the disk table 24 for ensuring the precise positioning on the disk table 24 and also to protect the optical disk 51 from physical interruption of other components in the housing 2.

The loading and unloading of the optical disk 51 on the disk table 24 are made through a loading opening which is opened and closed with the hatch door 12 mounted on the top panel 3.

Also, a loudspeaker unit for playing back an audio signal from the optical disk 51 for acoustic reproduction is installed in the housing 2 as not shown.

The disk playback apparatus 1 of the present invention having the foregoing arrangement like a conventional disk playback apparatus is placed with its support legs 9, mounted to the bottom panel 4 of the housing 2, directly on the platform 10, whereby external acoustic and mechanical vibrations from the platform 10 and the ambient space can be transmitted via the support legs 9 to the housing 2. While the mechanical vibration directly transmitted from the platform 10 is successfully attenuated by the support legs 9 made of the vibration absorbable material, the acoustic vibration from the ambient space is received directly by the housing 2 of the disk playback apparatus which will thus oscillate. Particularly, the acoustic vibration from the ambient space affects the housing 2 whenever the disk playback apparatus 1 is placed directly on the platform 10 or hanged in the air.

It is also common in the disk playback apparatus that the action of the disk rotating mechanism 21 produces vibration which may be transmitted via the base 25 or the other components to and hence oscillate the first circuit board 13 and the second circuit board 14. In addition, sound emitted from the loudspeaker unit is propagated to and oscillate the first circuit board 13 and the second circuit board 14.

The vibration on the housing 2 and the circuit boards 13 and 14 is radiated vertically from the surfaces of the panels 3 through 8 of the housing 2 and the circuit boards 13 and 14 and reflected by the opposite surfaces of the panels 3 through 8 and the circuit board 13 and 14 in the housing 2. The vibration received at the opposite surfaces of the panels 3 through 8 and the circuit board 13 and 14 is reflected with its reflection angle equivalent to the incident angle.

As described above, each opposite pair of the top panel 3 and the bottom panel 4, the front panel 5 and the back panel 6, the left side panel 7 and the right side panel 8 of the six-sided housing 2 are not parallel to each other in the disk playback apparatus 1 of the present invention This allows the vibration caused by the external acoustic and mechanical vibration on the housing 2 and radiated vertically from the surfaces of the panels 3 through 8 and the circuit boards 13 and 14 to be reflected on their opposite surfaces at corresponding angles defined by the non-parallel arrangement of the opposite panel 3 through 8 and the circuit boards 13 and 14 in the housing 2 and thus prevented from returning back to their starting surfaces. More specifically, the vibration reflected by the panels 3 through 8 and the circuit boards 13 and 14 is propagated as denoted by the arrow marks in FIGS. 4 and 5 and not returned back to its starting surfaces. Accordingly, the vibration radiated from the panels 3 through 8 and the circuit boards 13 and 14 is hardly interfered by its reflection coming from their opposite surfaces of the panels 3 through 8 and the circuit boards 13 and 14, thus avoiding the generation of unwanted resonation between the opposite surfaces of the panels 3 through 8, between the top panel 3 and the two circuit boards 13 and 14, or between the bottom panel 4 and the two circuit boards 13 and 14. Since no resonation between the opposite surfaces of the panels 3 through 8 and the circuit boards 13 and 14 in the housing 2 is allowed, any excessive vibration greater than the initial vibration on the panels 3 through 8 and the circuit boards 13 and 14 will be prevented.

Also, because the bottom panel 4 of the housing 2 in the disk playback apparatus 1 of the present invention is arranged not parallel to the mounting surface 10a of the platform 10, the vibration propagated from the platform 10 or from the bottom panel 4 hardly returns back to its starting surface as illustrated with the arrow mark in FIG. 5, hence avoiding resonation between the bottom panel 4 and the platform 10 and permitting no excessive vibration on the bottom panel 4.

Moreover, because the main side of the optical disk 51 which is loaded on the disk table 24 of the disk rotating mechanism 21 of which the spindle motor 22 is anchored to the base 25 with its spindle 23 extending vertical to the mounting surface 10a of the platform 10 on which the disk playback apparatus 1 is placed is set not parallel to the top panel 3 of the housing 2, resonation will hardly be allowed between the optical disk 51 and the top panel 3. In some cases, the optical disk 51 when loaded on and driven by the disk rotating mechanism 21 generates vibration from its surface deviation. It is however avoided by the above arrangement that the repeating of such vibration results in resonation between the top panel 3 and the optical disk 51.

In the disk playback apparatus 1 of the present invention, each pair of the top panel 3 and the bottom panel 4, the front panel 5 and the back panel 6, and the left side panel 7 and the right side panel 8 of the housing 2 are arranged not parallel to each other while the first circuit board 13 and the second circuit board 14 located opposite to the top panel 3 and the bottom panel 4 respectively are arranged not parallel to the top panel 3 and the bottom panel 4 respectively and to each other in the housing 2. This prevents the vibration exerted to or generated on the housing 2 from causing resonation between any opposite pair of the panels 3 through 8, between the top panel 4 and each of the two circuit boards 13 and 14, and between the bottom panel 5 and each of the two circuit boards 13 and 14, hence permitting no excessive vibration on the first circuit board 13 and the second circuit board 14 which serve as the playback unit and the signal processor unit respectively of the disk playback apparatus 1. As the first circuit board 13 and the second circuit board 14 are prevented from excessive vibration, electronic components mounted on the two circuit boards 13 and 14 will hardly suffer from vibration.

Since vibration on the electronic components mounted on the first circuit board 13 and the second circuit board 14 as well as the two circuit boards 13 and 14 themselves is hardly permitted, the action of the two circuit boards 13 and 14 or more particularly of the signal processor composed of the electronic components on the circuit boards 13 and 14 can be performed consistently, hence avoiding the addition of noises derived from the vibration to the signals of interest including an audio playback signal read out from the optical disk 51 and various control signals. Accordingly, the playback of the signals of interest will be carried out with optimum effects.

Also, the disk playback apparatus 1 of the present invention allows the optical disk 51 loaded on and driven by the disk rotating mechanism 21 in opposition to the top panel 3 to be set not parallel to the top panel 3, thus preventing resonation between the optical disk 51 and the top panel 3. As the optical disk 51 is prevented from no excessive vibration, it can perform stable movements and will hardly interrupt the action of the first circuit board 13 and the second circuit board 14 with its vibration hence guaranteeing the stable action of the signal processor.

With the loudspeaker unit in the housing emitting a tone burst at predetermined frequency and acoustic pressure, a change in the acoustic pressure inside and outside the housing was measured to compare the housing 101 of a conventional disk playback apparatus 100 such as described previously and the housing 2 of the disk playback apparatus 1 of the present invention.

A microphone was located 20 cm above substantially the center of each of the top panels 102 and 3 of the housings 101 and 2 respectively and used for collecting sounds to measure a change in the acoustic pressure outside the housings 101 and 2.

Similarly, to measure a change in the acoustic pressure inside the housings 101 and 2, a microphone was positioned between the first circuit board 111 in housing 100 and the top panel 102 and above the first circuit board 111 and a microphone was positioned between the first circuit board 13 in housing 2 and the top panel 3 and above the first circuit board 13. The position of the microphone corresponds to substantially the center of the main side of each of the first circuit boards 111 and 13.

Figure 6:
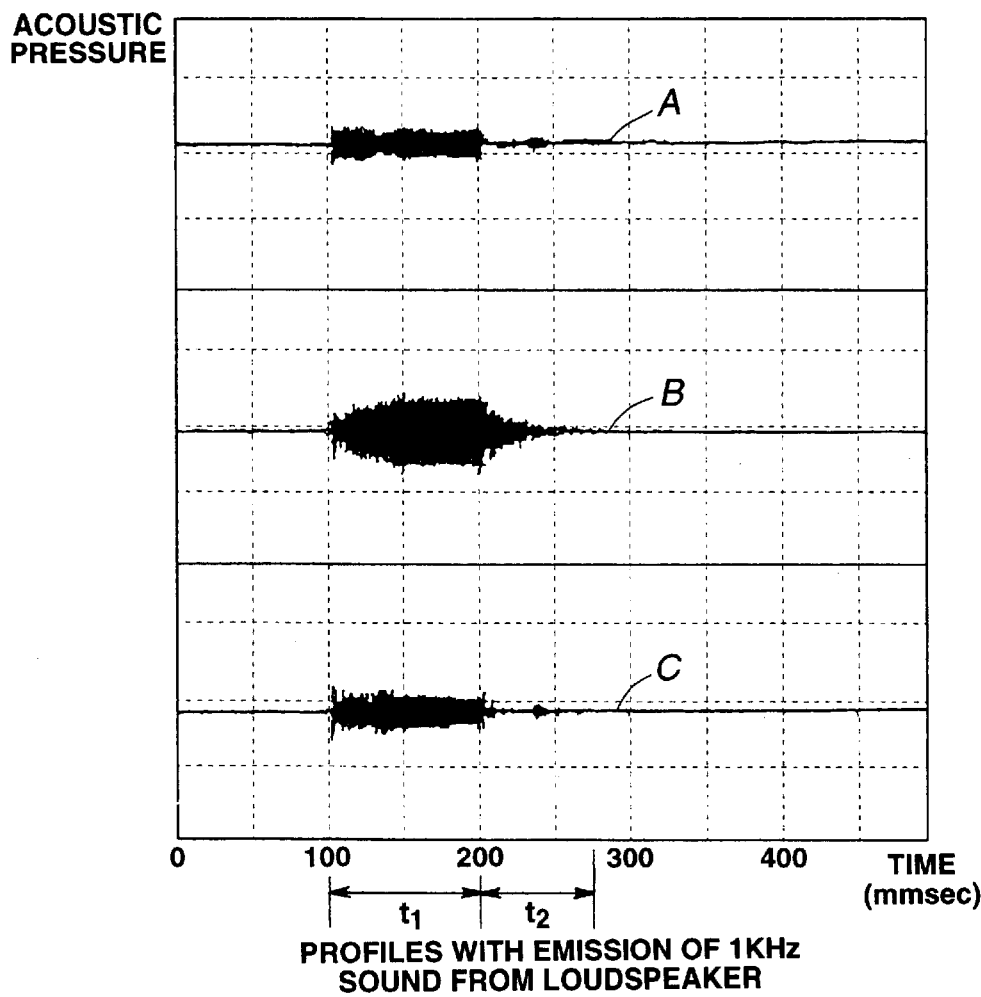
FIG. 6 is a characteristic diagram showing the measurements of acoustic pressure when tone burst has been emitted in a housing of each of the conventional disk playback apparatus and the disk playback apparatus of the present invention.

When the tone burst having a frequency of 1 kHz and a predetermined acoustic pressure was emitted for a period denoted by t1 in FIG. 6 or practically 100 mmsec from the loudspeaker unit in each of the housings 101 and 2, the acoustic pressure outside the housings 101 and 2 varied as is expressed by the profile A in FIG. 6.

The acoustic pressure inside the housing 110 of the conventional disk playback apparatus 100 was varied as denoted by the profile B in FIG. 6.

Also, the acoustic pressure inside the housing 2 of the disk playback apparatus 1 of the present invention was varied as shown by the profile C in FIG. 6.

As apparent from FIG. 6, the acoustic pressure released from the loudspeaker unit of the conventional disk playback apparatus 100 lasts a period of t2 until it decays from its start level and the decaying time of the acoustic pressure in the disk playback apparatus 1 of the present invention is much shorter than t2.

Again to compare between the two housings 101 and 2, was measured a change in the amplitude after emission of the tone burst at predetermined frequency and acoustic pressure for a predetermined period of time from the loudspeaker unit in each of the housings 101 and 2 of the conventional disk playback apparatus 100 and the disk playback apparatus 1 of the present invention respectively. The measurement of a change in the amplitude in the housings 101 and 2 was carried out using an acceleration pickup device, like the microphone of the preceding measurement, located between the first circuit board 111 and the top panel 102 in housing 101, substantially above the first circuit board 111, and substantially at the center of the main side of the first circuit board 111 and between the first circuit board 13 and the top panel 2 in housing 2, substantially above the first circuit board 13, and substantially at the center of the main side of the first circuit board 13.

Figure 7:
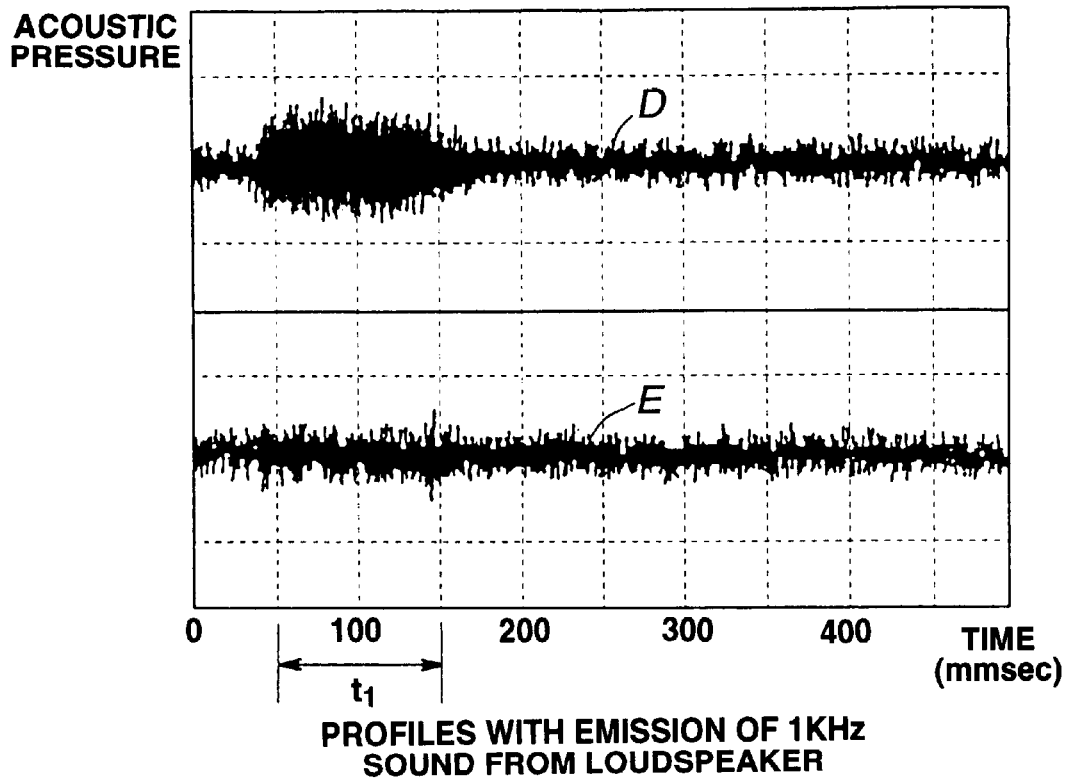
FIG. 7 is a characteristic diagram showing the measurement of a change in the amplitude when tone burst has been emitted in the housing of each of the conventional disk playback apparatus and the disk playback apparatus of the present invention.

In this measurement, the tone burst having a frequency of 1 kHz and a predetermined acoustic pressure was emitted for a period of t1 denoted in FIG. 7 or practically 100 mmsec was from the loudspeaker unit in the each of the housings 101 and 2 and a resultant change in the amplitude was measured using the acceleration pickup device at the corresponding locations.

As denoted by the profile D in FIG. 7, the amplitude in the conventional disk playback apparatus 100 was kept high during the emission and after termination of the emission of the tone burst from the loudspeaker unit and showed no significant sign of decay for a considerable length of time.

In the disk playback apparatus 1 of the present invention, the amplitude gave no explicit change between the emission and before and after the emission of the tone burst from the loudspeaker unit as is denoted by the profile E in FIG. 7.

As is apparent from FIGS. 6 and 7, the disk playback apparatus 1 yields a smaller change in acoustic pressure resulting from a tone burst emitted from the loudspeaker unit than the conventional disk playback apparatus 100. This occurs because, in the present invention, each opposite pair of the panels 3–4, 5–6 and 7–8, are not parallel, just as the top and bottom panels 3 and 4 are not parallel to each of the circuit boards 13 and 14. The non-parallel structure of the present invention is superior to the conventional disk playback apparatus 100 where each opposite pair of the panels 102–103, 104–105, 106–107 are in parallel, just as the top and bottom panels 102 and 103 are parallel to each of the circuit boards 111 and 112. Therefore, within the disk playback apparatus 1 the period of decay of the amplitude is minimized and no excessive vibration of the top panel 3 and the first circuit board 13 is permitted. This prevents the generation of resonance between the top panel 3 and the first circuit board 13 and protects the top panel 3 and the first circuit board 13 from suffering from excessive vibration higher than the magnitude of the tone burst output of the loudspeaker unit.

For proving more of the above mentioned advantages of setting opposite panels of the housing 2 not parallel to each other in the attenuation of resonance between the two opposite panels, some models were prepared and tested.

Figure 8:
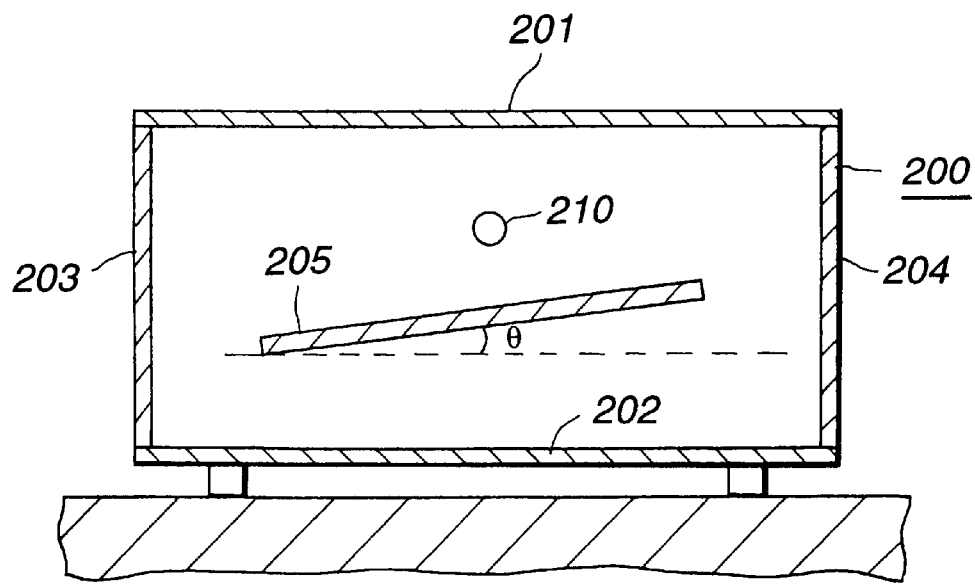
FIG. 8 is a schematic view showing a circuit board arranged at an angle in the housing where the acoustic pressure and a change in the amplitude are measured.

A housing 200 of such a cubic shape as shown in FIG. 8 was prepared. Each pair of a top panel 201 and a bottom panel 202, a front panel and a back panel, and a left side panel 203 and a right side panel 204 of the housing 200 which extended opposite to each other were arranged parallel to each other. A circuit board 205 made of the same rigid material as of the first circuit board 13 and the second circuit board 14 was installed in the housing 200 with its main side facing the top panel 201 and the bottom panel 202. The tone burst having a frequency of 1 kHz and a predetermined acoustic pressure similar to one described above was emitted for an instant of 100 mmsec from a loudspeaker unit mounted in the housing 200 and its change of acoustic pressure was measured with a microphone 210 located between the top panel 201 and the circuit board 205 and at substantially the center of the circuit board 205. Also, a change in the amplitude was measured at the corresponding location using an acceleration pickup device.

While the tilting angle θ of the circuit board 205 to the top panel 201 was varied in a range from one degree to three degrees, the acoustic pressure and a change in the amplitude were measured. It was found that the acoustic pressure and a change in its amplitude were substantially equal to those measured in the disk playback apparatus of the present invention when the tilting angle θ was three degrees. Also, the measurements were as good as those of the disk playback apparatus of the present invention when the tilting angle θ of the circuit board 205 to the top panel 201 was greater than three degrees.

It is clear from the above result that the angle between any two opposite panels is preferably greater than three degrees to avoid the generation of resonance between the two opposite panels and minimize excessive vibration on the panels.

With each of the conventional disk playback apparatus 100 and the disk playback apparatus 1 of the present invention placed on its corresponding platform 109 or 10, the acoustic pressure of vibration produced when a block of wood having a size of 30 cm×20 cm×10 cm had been dropped on the platform 109 or 10 was measured at different locations.

Figure 9:
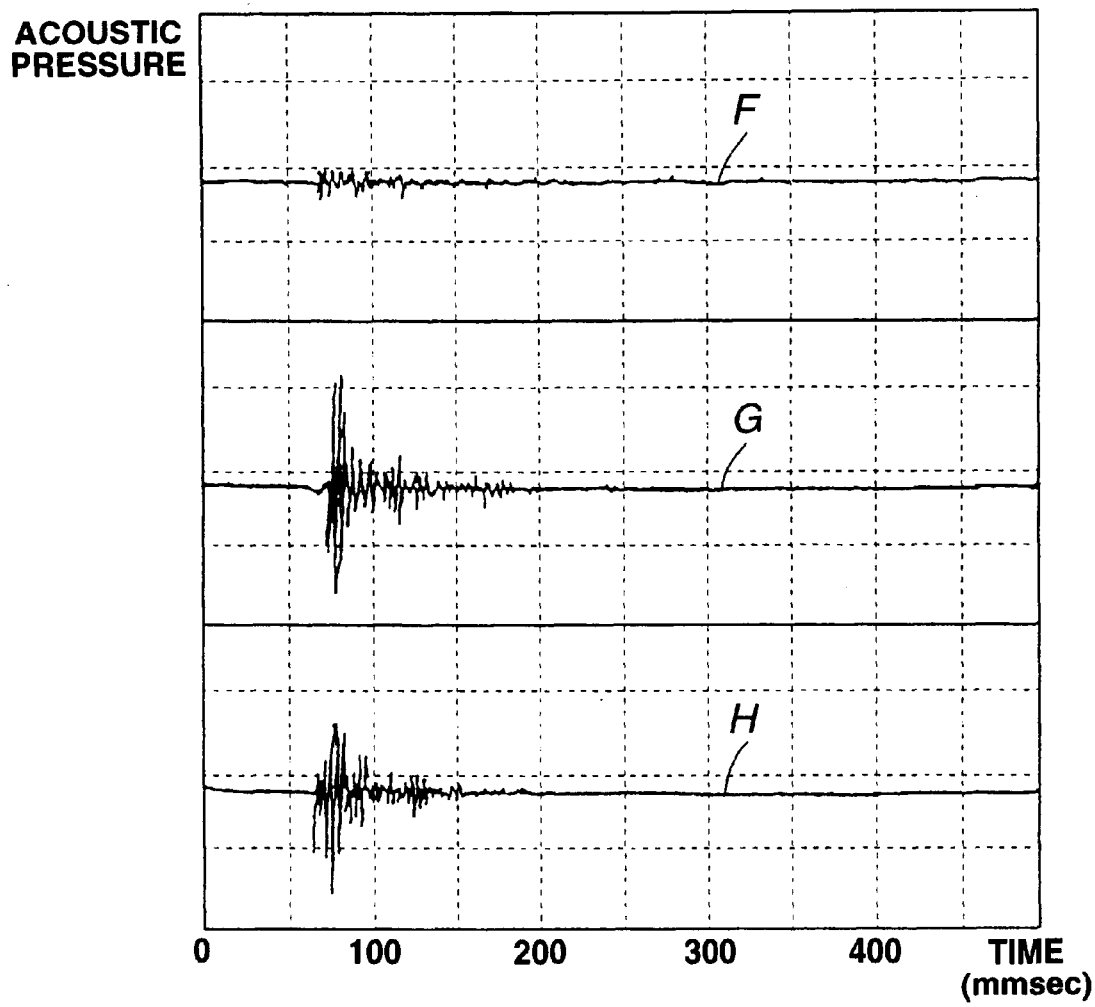
FIG. 9 is a characteristic diagram showing the measurements of acoustic pressure when external vibration has been introduced to the housing of each of the conventional disk playback apparatus and the disk playback apparatus of the present invention.

The profile denoted by F in FIG. 9 illustrates the measurement of the acoustic pressure with the microphone located 20 cm above substantially the center of each of the top panel 102 and 3 of their respective disk playback apparatuses 100 and 1 placed on the platforms 109 and 10 respectively.

Also, denoted by G and H in FIG. 9 are the measurements of the acoustic pressure in the conventional disk playback apparatus 100 and the disk playback apparatus 1 of the present invention respectively which were picked up by the microphone located between the first circuit board 111 and the top panel 102 and substantially above the first circuit board 111 in housing 101, and the microphone located between the first circuit board 13 and the top panel 3 and substantially above the first circuit board 13 in housing 2.

Then, a change in the amplitude of vibration generated when a block of wood having a size of 30 cm×20 cm×10 cm had been dropped on the platform 109 or 10 was measured at different locations in the housing 101 or 2 with each of the conventional disk playback apparatus 100 and the disk playback apparatus 1 of the present invention placed on its corresponding platform 109 or 10.

More specifically, a change in the amplitude in housing 101 was measured using an acceleration pickup device located between the first circuit board 111 and the top panel 102 and substantially above the first circuit board 111 while the acoustic pressure was measured using a microphone. A change in the amplitude in housing 2 was similarly measured using an acceleration pickup device located between the first circuit board 13 and the top panel 3 and substantially above the first circuit board 13 while the acoustic pressure was measured using a microphone. The resultant measurements are plotted as shown of the disk playback apparatus 100 in a profile denoted by I in FIG. 10 and of the disk playback apparatus 1 of the present invention in a profile denoted by J in FIG. 10.

Figure 10:
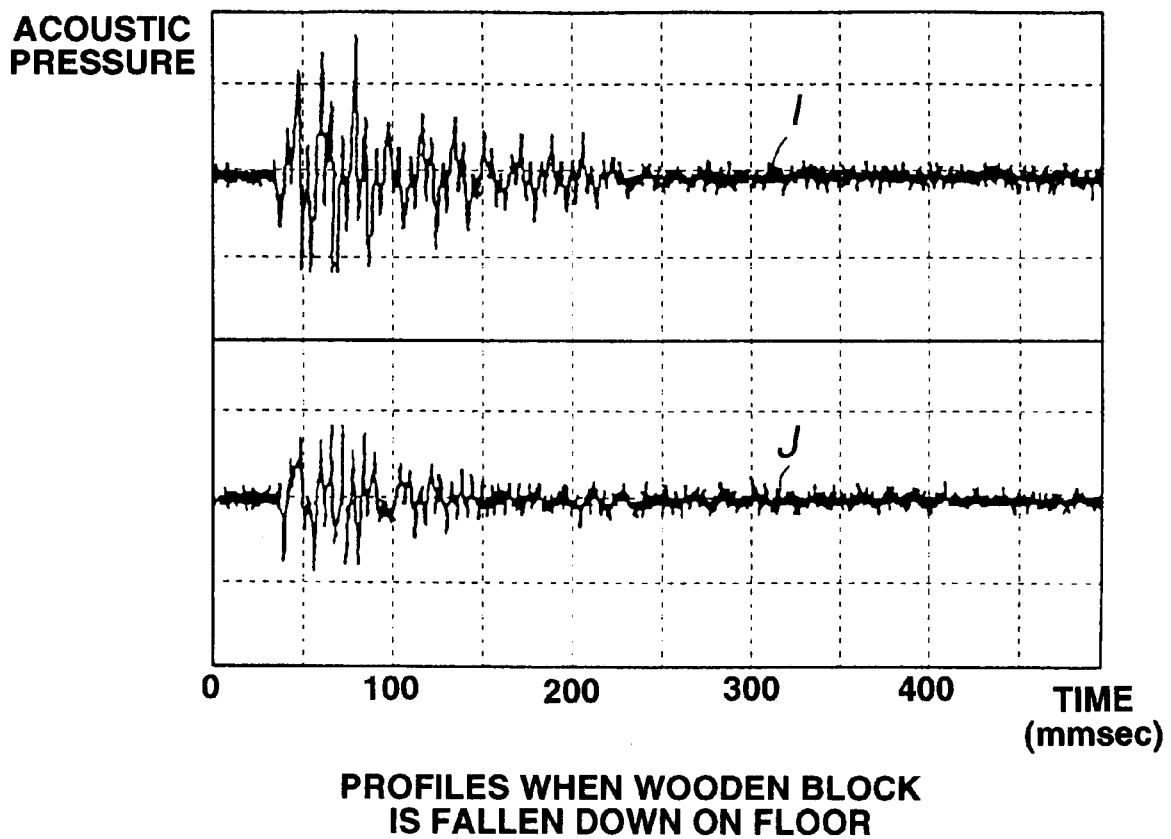
FIG. 10 is a characteristic diagram showing the measurements of a change in the amplitude when external vibration has been introduced to the housing of each of the conventional disk playback apparatus and the disk playback apparatus of the present invention.

It is apparent from FIGS. 9 and 10 that the acoustic pressure and the amplitude caused by external vibration are kept lower and smaller in the housing 2 of the disk playback apparatus 1 of the present invention, the amplitude being decayed quickly, than in that of the conventional disk playback apparatus 100.

As set forth above, there are arranged not parallel to each other between each opposite pair of the panels 3 through 8, between the top panel 3 and each of the circuit boards 13 and 14, and between the bottom panel 4 and each of the circuit boards 13

Industrial Applicability

The present invention is embodied in the form of an electronic apparatus for recording and/or playing back audio or video signals which has a six-sided housing, of which at least a pair of opposite sides are arranged not parallel to each other, and a signal processor unit composed of at least a circuit board having a degree of rigidity and installed in the housing, the circuit board of the signal processor situated with its main side facing the two non-parallelly arranged opposite sides of the housing. This prevents the generation of resonance between the main side of the circuit board and the two non-parallelly arranged opposite sides of the housing, thus permitting no excessive vibration on the circuit board and ensuring that the audio or video signals are record and/or played back at their optimum conditions. and 14 in the housing 2. Accordingly, when the housing 2 receives a stress of external vibration, it can prevent the generation of resonance between any two opposite panels thereof thus allowing no excessive vibration on the first 13 and the second circuit board 14 which constitute the signal processor unit. It will hence be ensured that the data signals including the audio signal and the control signals read out from the optical disk 51 are played back at their optimum characteristic condition without having any unwanted noise components driven from the vibration or with no deterioration of their properties.

In the disk playback apparatus 1 of the present invention, such excessive vibration as caused by the internal vibration generated in the housing 2 or the resonance in the housing 2 derived from external vibration is restrained regardless of the materials of the housing 2 and the two circuit boards 13 and 14. This gives more freedom in selecting the materials of the housing 2 or the first 13 and the second circuit board 14, contributing to the ease of the production and the low cost of the disk playback apparatus 1.

Although the present invention is described in the form of a disk playback apparatus, it is applicable with equal success to electronic apparatuses for recording and/or playing back audio or video signals including a video tape recorder, a video disk drive, and a television receiver as well as various audio apparatuses including a disk player, where the benefit is identical to that of the disk playback apparatus of the embodiment.

What is claimed is:

1. An electronic apparatus for use in recording and/or playing back at least one of audio and video signals, comprising:
   a housing having only six sides of which two opposite sides are a top panel and a bottom panel arranged not parallel to each other;
   a plurality of support legs of differing heights arranged on the bottom panel such that the bottom panel is not parallel to a horizontal surface on which the electronic apparatus is placed; and
   a plurality of rigid circuit boards installed in the housing, wherein at least one of the plurality of circuit boards includes a signal processor unit mounted thereon.

2. The electronic apparatus according to claim 1, wherein all remaining opposite sides of the housing are respectively arranged not parallel to each other.

3. The electronic apparatus according to claim 1, wherein the plurality of circuit boards are arranged not parallel to each other and arranged not parallel to any side of the housing.

4. An electronic apparatus for use in recording and/or playing back at least one of audio and video signals, comprising:
   a housing having only six sides of which two opposite sides are a top panel and a bottom panel arranged not parallel to each other;
   a plurality of support legs of differing heights arranged on the bottom panel such that the bottom panel is not parallel to a horizontal surface on which the electronic apparatus is placed; and
   a plurality of rigid circuit boards installed in the housing, wherein at least one of the plurality of circuit boards includes a signal processor unit mounted thereon, wherein a main side of each of the plurality of circuit boards faces the top panel and the bottom panel of the housing.

5. The electronic apparatus according to claim 4, wherein all remaining opposite sides of the housing are respectively arranged not parallel to each other.

6. The electronic apparatus according to claim 4, wherein the plurality of circuit boards are arranged not parallel to each other and arranged not parallel to any side of the housing.

7. An electronic apparatus for use in recording and/or playing back at least one of audio and video signals, comprising:
   a housing having only six sides of which two opposite sides are a top panel and a bottom panel arranged not parallel to each other;
   a plurality of support legs of differing heights arranged on the bottom panel such that the bottom panel is not parallel to a horizontal surface on which the electronic apparatus is placed; and
   a plurality of flat, rigid circuit boards installed in the housing, wherein at least one of the plurality of circuit boards includes a playback unit for playing a disk recording medium, wherein a main side of each of the plurality of circuit boards faces the top panel and the bottom panel of the housing.

8. The electronic apparatus according to claim 7, wherein all remaining opposite sides of the housing are respectively arranged not parallel to each other.

9. The electronic apparatus according to claim 7, wherein the plurality of circuit boards are arranged not parallel to each other and arranged not parallel to any side of the housing.

10. The electronic apparatus according to claim 7, wherein the playback unit has a disk rotating mechanism for rotating the disk recording medium, and the disk rotating mechanism is arranged so that the disk recording medium loaded thereon is not parallel to any side of the six-sided housing.

11. The electronic apparatus according to claim 10, wherein the disk rotating mechanism is arranged so that the disk recording medium loaded thereon is not parallel to the plurality of circuit boards.

12. The electronic apparatus according to claim 10, wherein the disk rotating mechanism is arranged so that the disk recording medium loaded thereon is parallel to the horizontal surface on which the electronic apparatus is placed.

13. An electronic apparatus for use in recording and/or playing back at least one of audio and video signals, comprising:

a housing having only six sides; and a plurality of rigid circuit boards, wherein at least one of the plurality of circuit boards includes a signal processor unit mounted thereon and the plurality of circuit boards are arranged in the housing to be not parallel to each other and not parallel to any opposite sides of the housing.

14. The electronic apparatus according to claim 13, wherein two opposite sides of the housing are a top panel and a bottom panel arranged not parallel to each other.

15. The electronic apparatus according to claim 14, further comprising:

a plurality of support legs of differing heights arranged on the bottom panel such that the bottom panel is not parallel to a horizontal surface on which the electronic apparatus is placed.

16. The electronic apparatus according to claim 13, wherein all remaining opposite sides of the housing are respectively arranged not parallel to each other.

17. The electronic apparatus according to claim 13, wherein the housing is shaped as a cube and the plurality of circuit boards are arranged at an angle less than 45 degrees from any opposite sides of the housing.

18. The electronic apparatus according to claim 13, wherein the plurality of circuit boards are substantially flat.

19. An electronic apparatus for use in recording and/or playing back at least one of audio and video signals, comprising:

a housing having only six sides;

a plurality of support legs of differing heights arranged on a bottom panel of the housing such that the bottom panel is not parallel to a horizontal surface on which the electronic apparatus is placed; and a plurality of rigid circuit boards installed in the housing, wherein at least one of the plurality of circuit boards includes a playback unit for playing a disk recording medium, wherein a main side of each of the plurality of circuit boards faces two opposite sides of the housing.

20. The electronic apparatus according to claim 19, wherein the plurality of circuit boards are arranged not parallel to each other and arranged not parallel to any side of the housing.

21. The electronic apparatus according to claim 20, wherein the two opposite sides of the housing facing the plurality of circuit boards are arranged not parallel to each other.

22. The electronic apparatus according to claim 21, wherein the two opposite sides of the housing are a top panel and the bottom panel of the housing.

23. The electronic apparatus according to claim 19, wherein all remaining opposite sides of the housing are respectively arranged not parallel to each other.

24. The electronic apparatus according to claim 19, wherein each of the plurality of circuit boards are shaped as a cube and arranged at an angle less than 45 degrees from the top panel and the bottom panel of the housing facing the plurality of circuit boards.

25. The electronic apparatus according to claim 19, wherein the plurality of circuit boards are substantially flat.

26. The electronic apparatus according to claim 19, wherein the playback unit has a disk rotating mechanism for rotating the disk recording medium, and is arranged so that the disk recording medium loaded thereon is not parallel to any side of the six-sided housing.

27. The electronic apparatus according to claim 26, wherein the disk rotating mechanism is arranged so that the disk recording medium loaded thereon is not parallel to the plurality of circuit boards.

28. The electronic apparatus according to claim 26, wherein the disk rotating mechanism is arranged so that the disk recording medium loaded thereon is parallel to the horizontal surface on which the electronic apparatus is placed.

* * * * *